United States Patent [19]
Chung

[11] Patent Number: 6,167,050
[45] Date of Patent: Dec. 26, 2000

[54] USER TRAFFIC CONTROL APPARATUS FOR ASYNCHRONOUS TRANSFER MODE NETWORKS

[75] Inventor: Jun-gun Chung, Kyunggi-do, Rep. of Korea

[73] Assignee: Samsung Electronics, Co., Ltd., Suwon, Rep. of Korea

[21] Appl. No.: 09/057,620

[22] Filed: Apr. 8, 1998

[30] Foreign Application Priority Data

Apr. 9, 1997 [KR] Rep. of Korea ............... 97-13005

[51] Int. Cl.[7] ........................... H04L 12/28; H04L 12/56
[52] U.S. Cl. ........................ 370/395; 370/232; 370/412; 370/429
[58] Field of Search ................... 370/389, 395, 370/412, 413, 414, 428, 429, 230, 232, 233, 235

[56] References Cited

U.S. PATENT DOCUMENTS

| 5,295,135 | 3/1999 | Kammerl | 370/233 |
|---|---|---|---|
| 5,339,332 | 8/1994 | Kammerl | 375/225 |
| 5,381,407 | 1/1995 | Chao | 370/233 |
| 5,448,567 | 9/1995 | Dighe et al. | 370/233 |
| 5,526,345 | 6/1996 | Wallmeier | 370/395 |
| 5,533,020 | 7/1996 | Byrn et al. | 370/395 |
| 5,559,798 | 9/1996 | Clarkson et al. | 370/468 |
| 5,596,576 | 1/1997 | Milito | 370/450 |
| 5,745,490 | 4/1998 | Ghufran et al. | 370/397 |
| 5,793,747 | 8/1998 | Kline | 370/230 |
| 5,796,719 | 8/1998 | Peris et al. | 370/231 |
| 5,978,356 | 11/1999 | Elwalid et al. | 370/230 |

*Primary Examiner*—Ajit Patel
*Assistant Examiner*—Bob A. Phunkulh
*Attorney, Agent, or Firm*—Marger Johnson & McCollom, P.C.

[57] ABSTRACT

An ATM user traffic control apparatus adopts an MBEA (most behind expected arrival) multiplexing mechanism for UNI (User-to-Network Interface) and adaptively controls ATM traffic streams that a plurality of traffic sources send into a UPC (Usage Parameter Control) unit of an ATM network in consideration of traffic priorities of the traffic streams. The traffic control apparatus is provided with a plurality of small leaky bucket buffers and a plurality of virtual bucket buffers corresponding to the leaky buckets, respectively. A pair of leaky and virtual buckets are provided for each traffic source. The apparatus also includes a detection unit that detects whether the cells drained from the leaky buckets are conforming cells and provides information regarding the traffic streams where there exist conforming cells. A calculation unit for calculating the values of priority functions of the traffic streams with the conforming cells, and a priority determination unit for determining a top priority traffic stream by comparing the priority function values are provided for the apparatus. An ATM service multiplexer sends the top priority traffic stream to the UPC unit in preference to the other streams.

5 Claims, 4 Drawing Sheets

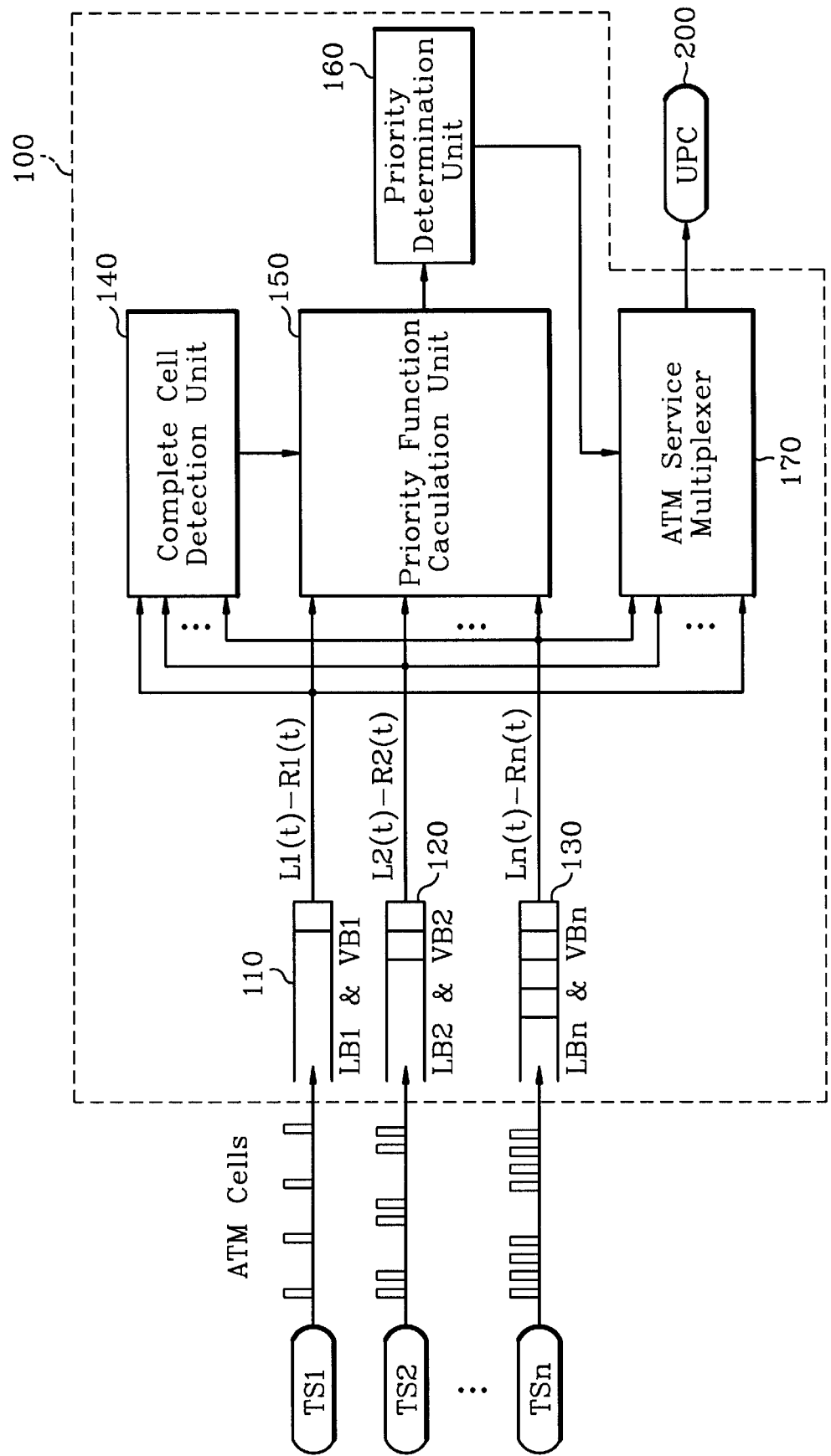

Fig. 4A
Leaky Bucket (LBi)
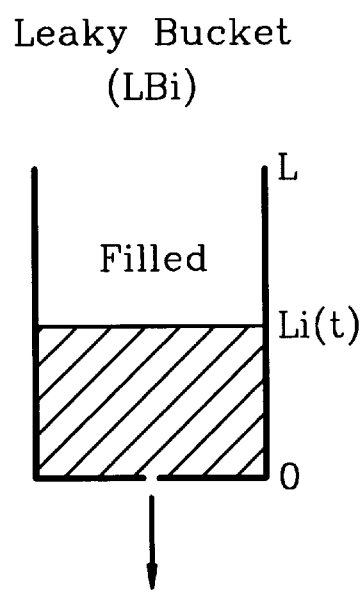
Virtual Bucket (VBi)
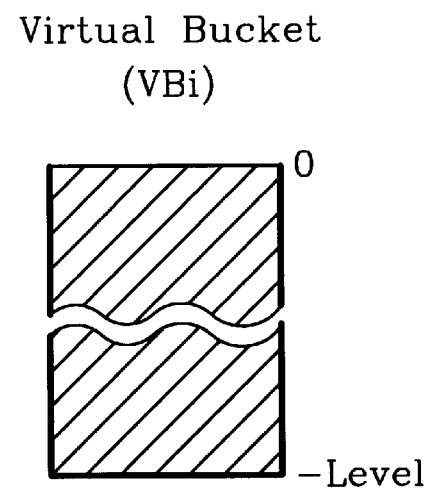
Fig. 4B
Leaky Bucket (LBi)
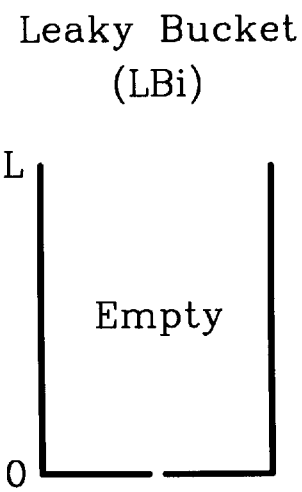
Virtual Bucket (VBi)
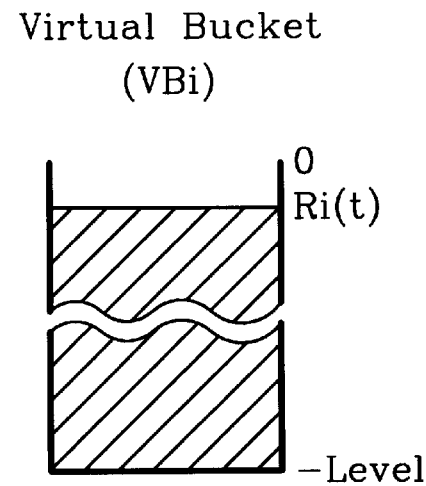

USER TRAFFIC CONTROL APPARATUS FOR ASYNCHRONOUS TRANSFER MODE NETWORKS

FIELD OF THE INVENTION

The present invention relates to broadband integrated services digital networks (hereinafter abbreviated B-ISDNs) and, more particularly, to a user traffic control apparatus for B-ISDNs based on asynchronous transfer mode (ATM).

BACKGROUND OF THE INVENTION

Today, earlier than most expected, we are experiencing the next major advancement in communications. The forthcoming B-ISDNs will make it possible to exchange new bandwidth-intensive applications and to provide integrated broadband services such as high-speed-data service, video phone, video conferencing, remote medical imaging, interactive multimedia, CATV services, etc. One of the enabling technologies may be ATM, and it will provide a dramatic improvement in the way we share information.

ATM addresses carrier's needs to efficiently move all types of information from one place to another across a shared transport medium. ATM's efficiencies can be attributed primarily to two characteristics: fixed cell length and logical networking. The ATM cell is the basic unit of information transfer in the B-ISDN ATM protocol. The cell is comprised of 53 bytes. Five of the bytes make up the header field and the remaining 48 bytes form the user information field.

The fixed length 53 byte cell enables extremely high switching speeds (above 155 Mbps) and low CDV (Cell Delay Variation). High switching speeds are attainable because ATM switches do not have to be concerned with the length of information cells, and consequently, are not required to interpret both headers and trailers associated with frames. High switching speeds are important in supporting emerging, bandwidth-intensive applications like concurrent engineering and supercomputer connectivity. The absence of variable-length packets in an ATM network is a key factor in eliminating excessive delay variation. Variable-length packet data uses as much bandwidth as possible, momentarily depriving other traffic of bandwidth. This is usually not a problem if all of the traffic on a given facility is bursty data. But if isochronous, timing-sensitive traffic is included, excessive delay variation will occur, causing echoes in voice communications and blips in video conferencing sessions.

The UPC (Usage Parameter Control) and NPC (Network Node Control) do the same job at different interfaces. The UPC function is performed at the User-to-Network Interface (UNI), while the NPC function is performed at the Network Node Interface (NNI). The main purpose of UPC/NPC is to protect the network resources from malicious as well as unintentional misbehavior which can effect QoS (Quality of Service) of other already established connections. Another commonly used name for UPC/NPC is policing since the UPC and NPC perform a role similar to the police in society. The UPC/NPC ensures that bandwidth and buffering resources are fairly allocated among the users according to their traffic contracts.

FIG. 1 is a schematic illustration of typical ATM multiplexing in a UNI. An ATM service multiplexer 10 performs multiplexing of cells from n traffic sources TS1, TS2, ..., TSn. In an ATM network, excessive reservation of resources by one user affects traffic for other users. So PCR (Peak Cell Rate) or throughput must be policed at the UNI by a UPC 20 in the network to ensure that the negotiated connection parameters per VCC (Virtual Channel Connection) or VPC (Virtual Path Connection) between network and subscriber is maintained by each of the users. Traffic parameters describe the desired throughput and QoS in the negotiated contract. The traffic parameters are to be monitored in real time at the arrival of each cell.

Due to ATM's inherent property to support any bandwidth requirement, an access control scheme is needed to ensure that a user does not exceed his negotiated parameters (e.g., PCR, Cell Delay, Burstiness, etc.). The policing will be an important aspect of the future B-ISDNs based on ATM. In accordance with the policing, non-conforming cells are marked as low priority cells or they are lost. The UPC polices the incoming ATM cells to be transmitted into the ATM network at constant transfer rate, regardless of the burstiness of the incoming cells. CCITT (currently ITU) has standardized two equivalent mechanism for policing; one of them being the Leaky Bucket algorithm. A formal definition of the leaky bucket algorithm is found in the ATM Forum UNI specification or CCITT Recommendation 1.371.

FIGS. 2A and 2B are diagrams for explaining how the leaky bucket controls the traffic. The non-transmitted cells among the incoming cells which burst into UPC must be stored in its leaky bucket(s) due to the transfer rate of the UPC. As implied by the name, a leaky bucket behaves like a bucket with a hole in the bottom that causes it to leak at a certain rate corresponding to a traffic cell rate parameter. If cells flows into the bucket faster than they flow out of the bucket, then the bucket eventually overflows, thereby causing cells to be discarded until there is enough room to accept new cells again. The depth of the bucket corresponds to a traffic parameter or a tolerance parameter. Each cell arrival is analogous to a cup of fluid flow that is poured into one or more buckets for use in conformance checking. The funneling of cell arrival fluid into the bucket(s) is controlled by the Cell Loss Priority (CLP) bit in the ATM cell header. The PCR and SCR (Sustainable Cell Rate) traffic parameters are formally defined in terms of a virtual scheduling algorithm (namely, a leaky bucket algorithm) in ITU/CCITT Recommendation 1.371 and the ATM Forum UNI specification. These parameters are specified either in a signaling message or at subscription time or are implicitly defined by the network according to default rules.

The operation of the leaky bucket is described with reference to FIGS. 2A and 2B for examples of a conforming and non-conforming cell flow. Referring to FIG. 2A, when a burst of cells 30 enters, the UPC checks to see if the entire bucket increment for the incoming cells 30 can be added to the current bucket contents without overflowing. If the bucket 40 would not overflow, then the cells 30 are conforming, otherwise they are non-conforming as shown in FIG. 2B. As shown in the figures, fluid from a cell arrival can be added to the bucket 40 only if the incoming cells are conforming, but the fluid, i.e. the cell data, for non-conforming cells is discarded.

Therefore, if it is desired that all incoming cells be transmitted to the ATM network, the entire cells should be the conforming cells. However, it is not expected that all of the incoming cells will be conforming since a plurality of traffic sources with different traffic parameters are multiplexed in the UNI.

SUMMARY OF THE INVENTION

It is an object of the present invention to provide a user traffic control apparatus for ATM networks, which has an improved cell loss rate.

In order to attain the above object, according to an aspect of the present invention, there is provided a user traffic control apparatus for adaptively controlling ATM traffic streams that a plurality of traffic sources send into a UPC (Usage Parameter Control) unit of an ATM network in consideration of traffic priorities of the traffic streams. The apparatus includes a plurality of leaky bucket buffers each which is filled with incoming ATM cells from a corresponding traffic source but, at the same time, drains an average number of cells per a given time slot. The leaky buckets each have a bucket level $L_f(t)$ (where, t represents an arbitrary time) directly proportional to the number of the ATM cells filled therein. The apparatus further includes a plurality of virtual bucket buffers corresponding to each of the leaky buckets, respectively. The virtual buckets each have the bucket level $R_f(t)$ of a maximum value while a corresponding leaky bucket is filled with at least one ATM cell and has a bucket level $R_f(t)$ of a value less than the maximum value thereof and inversely proportional to a time having been elapsed since the corresponding leaky bucket has been empty. The apparatus also has a detection unit that detects whether the cells drained from the leaky buckets are the conforming cells and provides information on the traffic streams where there exist conforming cells. A calculation unit which calculates the values of priority functions of the traffic streams having the conforming cells is provided for the apparatus. The apparatus further includes a priority determination unit for determining a top priority traffic stream by comparing the priority function values, and an ATM service multiplexer for sending the top priority traffic stream to the UPC unit in preference to the other streams.

In an embodiment of an apparatus of the present invention, the maximum and the minimum values of the each virtual bucket level $R_f(t)$ are zero and a predetermined minus value, respectively. Then, the priority determination unit takes a traffic stream with the smallest priority function value to be the top priority stream. In case there are two or more traffic streams having the same priority function value simultaneously, the priority determinator determines the top priority stream by comparing the virtual bucket levels $R_f(t)$.

BRIEF DESCRIPTION OF THE DRAWINGS

The present invention will be described by way of exemplary embodiments, but not limitations, illustrated in the accompanying drawings in which like references denote similar elements, and in which:

FIG. 3 is a diagram illustrating an embodiment of an ATM user traffic control apparatus used for UNI according to the present invention; and FIGS. 4A and 4B are diagrams for explaining the buffering operations of the leaky and virtual buckets used in the traffic control apparatus of FIG. 3.

DESCRIPTION OF THE PREFERRED EMBODIMENT

Figure 1:
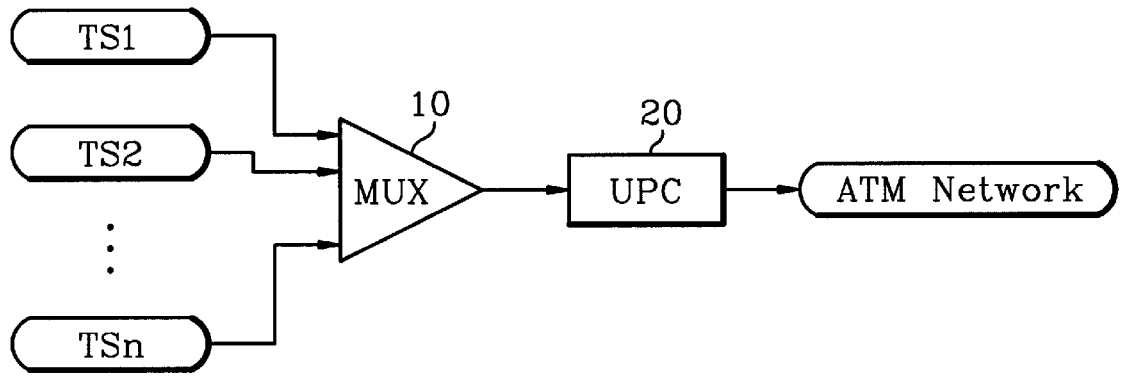
FIG. 1 is a schematic diagram of a typical ATM multiplexer for UNI.
Figure 2A:
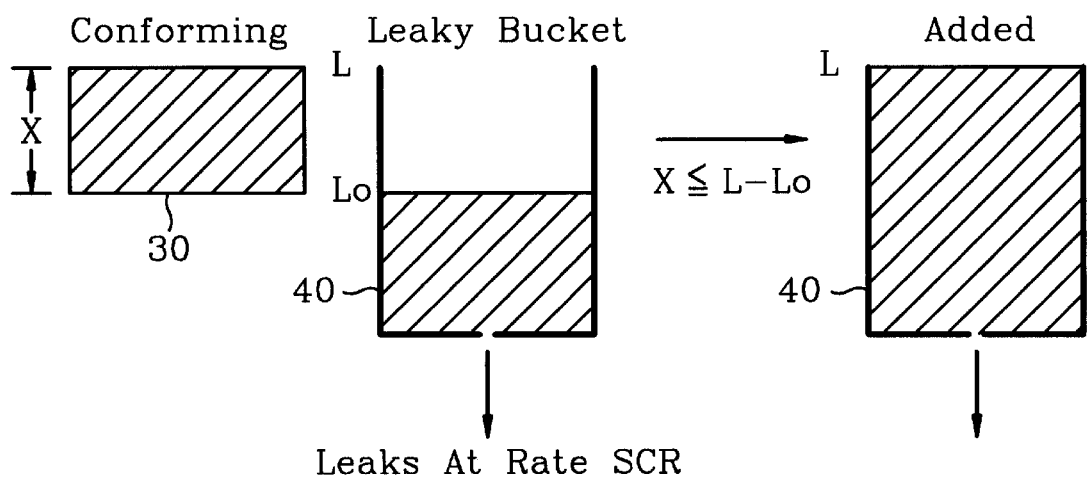
FIGS. 2A and 2B are diagrams for explaining the operation of a leaky bucket buffer used in UPC.
Figure 2B:
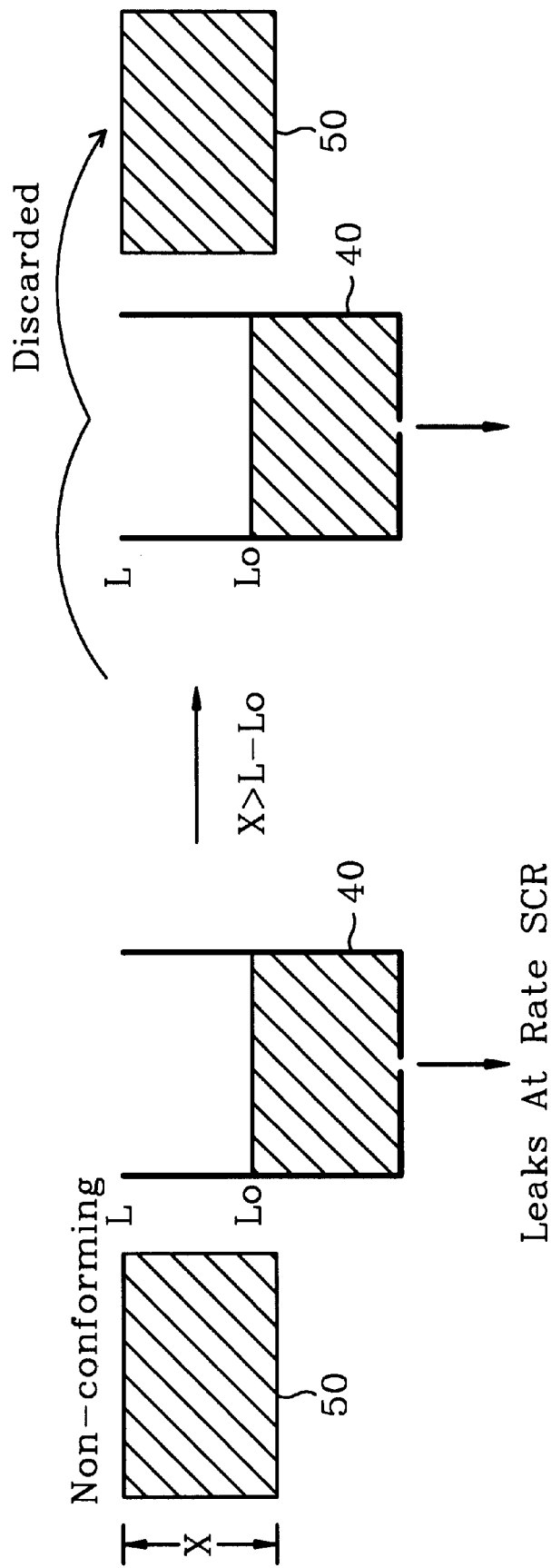

ATM networking requires the establishment of virtual connections between the sender and receiver. The connections are called virtual connections because they exist in the physical sense only for as long as the message traverses the ATM network. The virtual connections are established using the address fields in the 5-byte ATM cell header. Routing tables in ATM switches read the addresses and transport the cells across the network to the appropriate destination, thereby creating a virtual connection.

An ATM network needs Traffic Control capabilities to cope with the various service classes and to cope with potential errors within the network at any time. The network should have the following traffic control capabilities: Network Resource Management, Connection Admission Control (CAC), Usage Parameter Control (UPC), Network Parameter Control (NPC), Priority Control (PC), Traffic Shaping (TS), and Congestion Control (CC).

Traffic control procedures for ATM networks are currently not fully standardized. But the goal of these procedures are to achieve good ATM network efficiency and to meet the user's QoS (Quality of Service) requirements with a method that is generally applicable. Hence, more sophisticated traffic control and resource management actions are being taken into account. The basic problem of ATM networks is the statistical behavior of the cell arrival process, for instance, at a buffer where cells generated at several different sources are multiplexed together. It has been found that the QoS parameters, such as jitter and loss probability, are very sensitive to the assumed source characteristic. Therefore, it is necessary to use detailed source traffic models for performance evaluation.

Referring to FIG. 3, an ATM user traffic control apparatus 100 of the present invention adopts an MBEA (most behind expected arrival) multiplexing mechanism for UNI (User-to-Network Interface) and adaptively controls ATM traffic streams that a plurality of traffic sources TS1, TS2, ..., and TSn send into a UPC (Usage Parameter Control) unit 200 of an ATM network in consideration of traffic priorities of the traffic streams. The traffic control apparatus 100 is provided with a plurality of small leaky bucket buffers LB1, LB2, ..., and LBn and a plurality of virtual bucket buffers VB1, VB2, ..., and VBn corresponding to the leaky buckets LB1, LB2, ..., and LBn, respectively. A pair of leaky and virtual buckets 110 (LB1 & VB1), 120 (LB2 & VB2), or 130 (LBn & VBn) are provided for each traffic source TS1, TS2, ..., or TSn.

FIGS. 4A and 4B are diagrams for explaining the buffering operations of the leaky and virtual bucket pair LBi and VBi (where, i=1, 2, ..., or n) for each traffic source TSi. Referring to FIG. 4A, each leaky bucket LBi behaves like a bucket with a hole in the bottom that causes it to leak at a certain rate (i.e, average number of cells per second) corresponding to a traffic cell rate parameter, thereby controlling the traffic that a source TSi sends into an ATM network. Each leaky bucket LBi has a bucket level $L_f(t)$ (where, i=1, 2, ..., or n, and t represents an arbitrary time) directly proportional to the number of the ATM cells filled therein. Each virtual bucket VBi has a bucket level $R_f(t)$ of zero (maximum value) while a corresponding leaky bucket LBi is filled with at least one ATM cell. But the virtual bucket VBi has a bucket level $R_f(t)$ of a value less than its maximum value (i.e., zero) and decreasing as time has elapsed since the corresponding leaky bucket LBi has been empty; the virtual bucket level $R_f(t)$ is inversely proportional to a time that has been elapsed since the corresponding leaky bucket LBi has been emptied. The minimum value of the each virtual bucket level $R_f(t)$ is a predetermined minus value.

Referring back to FIG. 3, the user traffic control apparatus 100 further includes a complete ATM cell detection unit 140, a priority function calculation unit 150, a priority determination unit 160, and an ATM service multiplexer 170.

The complete ATM cell detection unit 140 detects whether the cells drained from the leaky buckets LB1, LB2, ..., LBn are conforming cells and provides information regarding the traffic streams where there exist conforming cells. The priority function calculation unit 150 calculates the values of priority functions $\eta_1(t)$, $\eta_2(t)$, ..., and $\eta_n(t)$ of the traffic streams TS1, TS2, ..., and TSn having the conforming ATM cells. Each priority function $\eta_i(t)$ (where, i=1, 2, ..., and n) is given by:

$$\eta_i(t)=L_i(t)-R_i(t)$$

The priority function $\eta_i(t)$ represents either the latest time when the corresponding leaky bucket LBi empties or the time when it is to be empty. At any arbitrary time, each traffic stream has the priority function $\eta_i(t)$.

The priority determination unit 160 determines a top priority traffic stream by comparing the priority function values. The priority determination unit 160 takes a traffic stream having the smallest priority function value to be the top priority stream. This means that the traffic stream whose corresponding leaky bucket becomes empty at the latest time will be transferred to the UPC 200. Then, the leaky bucket associated with the top priority stream makes it possible to receive conforming cells from the corresponding traffic source at soon and to successively transfer them to the UPC 200 since the bucket is in the state where all cells either have been or will be drained from it.

But, if there are at least two traffic streams having the same priority function value simultaneously, the unit 160 determines the top priority stream by comparing the virtual bucket levels $R_i(t)$. In such a case, a traffic stream having a negative virtual bucket level is preferredly taken as the top priority stream. The ATM service multiplexer 170 sends the top priority traffic stream to the UPC unit 200 in preference to the other streams. This is the reason why, if the corresponding leaky bucket LBi is not empty (i.e., if the virtual bucket level $R_i(t)$ is zero), the $\eta_i(t)$ will decrease and thus there is a probability that the corresponding traffic stream will be transferred to the UPC 200 at next time slot, but the $\eta_i(t)$ will increase if the virtual bucket levels $R_i(t)$ is negative.

While the invention has been described in terms of an exemplary embodiment, it is contemplated that it may be practiced as outlined above with modifications within the spirit and scope of the appended claims.

What is claimed is:

1. An apparatus for controlling asynchronous transfer mode (ATM) traffic streams that a plurality of traffic sources (TS1, TS2, ..., and TSn) send into a UPC (Usage Parameter Control) unit of an ATM network the apparatus, comprising:

a plurality of leaky bucket buffers (LB1, LB2, ..., and LBn) each being filled with incoming ATM cells from a corresponding traffic source (TSi) (where, i=1, 2, ..., or n) but, at the same time, draining an average number of cells per a given time slot, wherein said each leaky bucket (LBi) has a bucket level $L_i(t)$ (where, t represents an arbitrary time) proportional to the number of the ATM cells filled therein;

a plurality of virtual bucket buffers (VB1, VB2, ..., and VBn) corresponding to said leaky buckets (LB1, LB2, ..., and LBn), respectively, wherein said each virtual bucket (VBi) has a bucket level $R_i(t)$ of a maximum value while a corresponding leaky bucket (LBi) is filled with at least one ATM cell and has the bucket level $R_i(t)$ of a value less than the maximum value thereof and inversely proportional to a time having been elapsed since said corresponding leaky bucket (LBi) has been empty;

detection means for detecting whether the cells drained from said leaky buckets are the conforming cells and for providing information regarding traffic streams where there exist conforming cells;

calculation means for calculating a value of priority function $\eta_i(t)$ corresponding to the traffic streams having the conforming cells by $\eta_i(t)=L_i(t)-R_i(t)$;

priority determination means for determining a top priority traffic stream by comparing the priority function values $\eta_i(t)$; and ATM multiplexing means for sending the top priority traffic stream to said UPC unit in preference to the other streams.

2. The apparatus according to claim 1, wherein the maximum and the minimum values of the each virtual bucket level $R_i(t)$ are zero and a predetermined minus value, respectively; and said priority determination means takes a traffic stream with the smallest priority function value to be the top priority stream.

3. The apparatus according to claim 2, wherein said priority determination means determines the top priority stream by comparing the virtual bucket levels $R_i(t)$ when there are at least two traffic streams having the same priority function value.

4. A method for controlling asynchronous transfer mode (ATM) traffic streams arriving at a usage parameter control (UPC) unit in an ATM network, the method comprising:

buffering incoming ATM cells from each of a plurality of traffic sources producing ATM traffic streams into a corresponding leaky bucket buffer $LB_j$;

draining an average number of cells from each bucket $LB_j$ during a given time slot, wherein each leaky bucket buffer $LB_j$ has a bucket level $L_i(t)$ proportional to a number of ATM cells present in the buffer $LB_j$;

calculating a virtual bucket level $R_i(t)$ corresponding to each leaky bucket buffer $LB_j$, where $R_i(t)$ is set to a predetermined maximum value when at least one cell is present in the corresponding leaky bucket $LB_j$ and where $R_i(t)$ is inversely proportional to an elapsed time since the corresponding leaky bucket buffer $LB_j$ has been empty when the bucket $LB_j$ is empty;

detecting whether the ATM cells drained from each leaky bucket buffer $LB_j$ are conforming cells in order to identify traffic sources having conforming cells;

calculating a value of priority function $\eta_i(t)$ corresponding to the identified traffic streams having conforming cells using the equation $\eta_i(t)=L_i(t)-R_i(t)$;

determining a top priority traffic source by comparing the priority function values $\eta_i(t)$ of the identified traffic streams having conforming cells; and selecting the top priority traffic stream for routing to the UPC unit.

5. The method of claim 4, wherein:

the step of calculating a virtual bucket level $R_i(t)$ corresponding to each leaky bucket buffer $LB_j$ further comprises:

setting the maximum value of the each virtual bucket level $R_i(t)$ to zero, and setting a minimum value of the each virtual bucket level $R_i(t)$ to a predetermined minus value; and the step of determining a top priority traffic source further comprises selecting the traffic stream having the smallest priority function value to be the top priority stream.

* * * * *

UNITED STATES PATENT AND TRADEMARK OFFICE
CERTIFICATE OF CORRECTION

PATENT NO.    : 6,167,050
DATED         : December 26, 2000
INVENTOR(S)   : Chung It is certified that error appears in the above-identified patent and that said Letters Patent is hereby corrected as shown below:

<u>Title page,</u>
Item [57], ABSTRACT,
"values of priority" should read -- values regarding priority --.

Signed and Sealed this

Twenty-third Day of September, 2003

JAMES E. ROGAN
*Director of the United States Patent and Trademark Office*